(12) United States Patent
Taylor

(10) Patent No.: US 7,508,225 B2
(45) Date of Patent: Mar. 24, 2009

(54) APPARATUS, SYSTEM AND METHOD FOR IDENTIFICATION WITH TEMPERATURE DEPENDENT RESISTIVE DEVICE

(75) Inventor: John Philip Taylor, San Diego, CA (US)

(73) Assignee: Kyocera Wireless Corporation, San Diego, CA (US)

( * ) Notice: Subject to any disclaimer, the term of this patent is extended or adjusted under 35 U.S.C. 154(b) by 280 days.

(21) Appl. No.: 11/470,747

(22) Filed: Sep. 7, 2006

(65) Prior Publication Data
US 2008/0079446 A1 Apr. 3, 2008

(51) Int. Cl.
*G01R 27/08* (2006.01)
(52) U.S. Cl. .................... 324/721; 324/713
(58) Field of Classification Search ............ 324/713, 324/721; 320/106, 150
See application file for complete search history.

(56) References Cited

U.S. PATENT DOCUMENTS

| | | | | |
|---|---|---|---|---|
| 3,604,885 A | * | 9/1971 | Inoue | 219/69.18 |
| 5,460,901 A | * | 10/1995 | Syrjala | 429/90 |
| 5,489,834 A | | 2/1996 | Pitkanen | |
| 5,945,803 A | * | 8/1999 | Brotto et al. | 320/106 |
| 6,112,105 A | * | 8/2000 | Olsson | 455/572 |
| 6,215,274 B1 | * | 4/2001 | Dotzler | 320/106 |
| 2003/0214361 A1 | * | 11/2003 | Nishikido | 331/57 |
| 2007/0263332 A1 | * | 11/2007 | Apfel | 361/90 |

FOREIGN PATENT DOCUMENTS

| | | | |
|---|---|---|---|
| JP | 06 333604 | | 12/1994 |
| JP | 08195227 A | * | 7/1996 |
| WO | WO 99/22433 | | 5/1999 |

\* cited by examiner

*Primary Examiner*—Timothy J Dole
*Assistant Examiner*—John Zhu

(57) ABSTRACT

An apparatus, system, and method provide device identification and temperature sensing of a device with a temperature sensing circuit (TSC) within the device. The TSC includes a temperature sensing element (TSE) connected in parallel with a voltage clamping network (VCN) that limits the voltage across the TSE to an identification voltage within an identification voltage range when the voltage is greater than or equal to a lower voltage of the identification voltage range. When a voltage below the lower range is applied to the TSC, the VCN appears as an open circuit and the resistance of the TSC corresponds to temperature. For cost or other concerns, a first TSC may omit the VCN to provide a maximum identification voltage and other TSCs may include VCNs with lower identification voltage ranges.

20 Claims, 5 Drawing Sheets

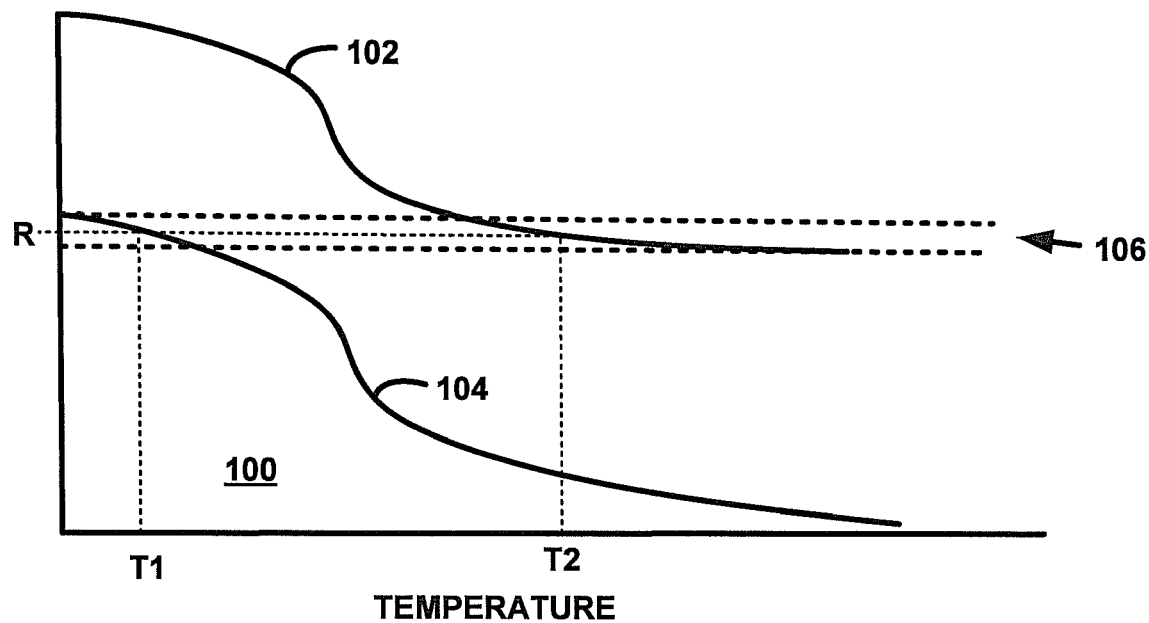
FIG. 1 *(RELATED ART)*
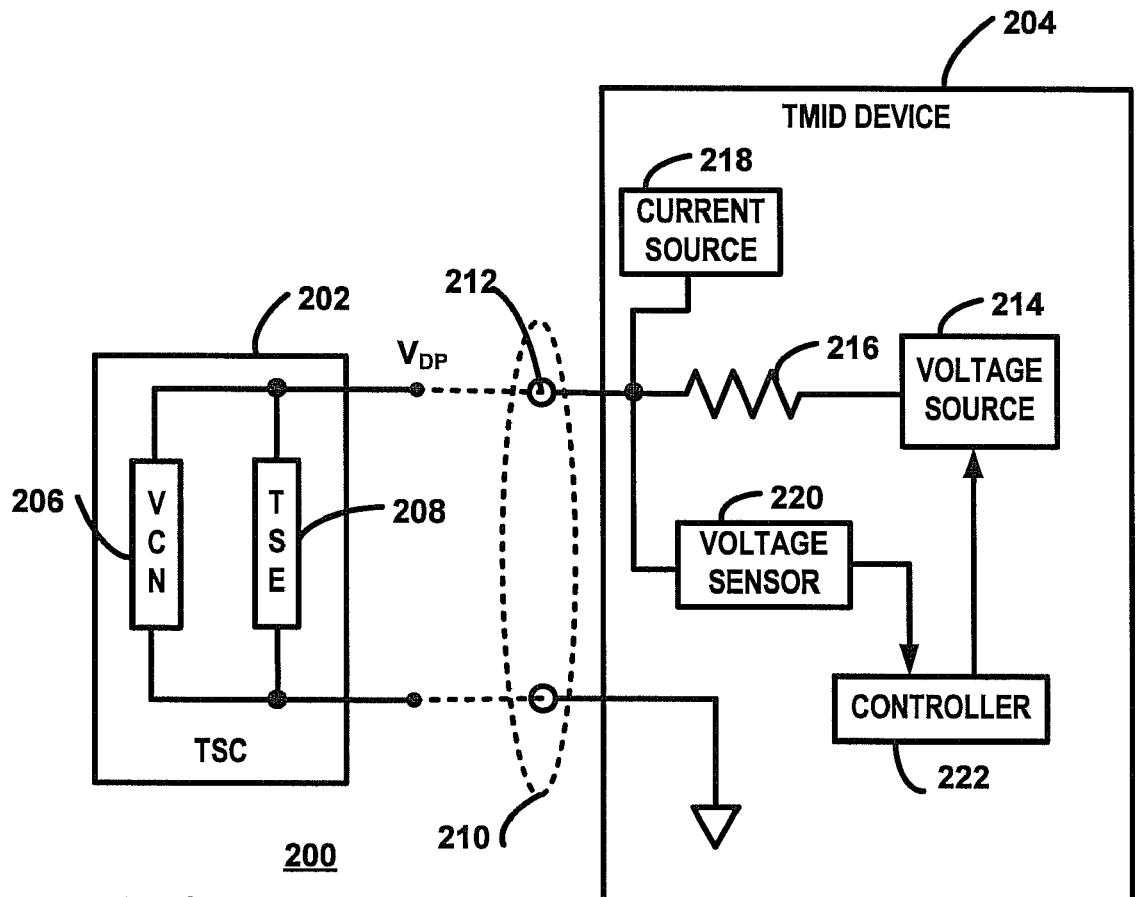
FIG. 2

FIG. 4    400

APPARATUS, SYSTEM AND METHOD FOR IDENTIFICATION WITH TEMPERATURE DEPENDENT RESISTIVE DEVICE

TECHNICAL FIELD

The invention relates in general to temperature dependent resistive devices and more specifically to an apparatus, system, and method for identification with temperature dependent resistive devices.

BACKGROUND

Many systems and circuits utilize temperature sensing elements (TSEs) to determine a temperature of a device. For example, typical temperature dependent resistive devices (TDRD) such as thermistors may have resistances that are inversely proportional to temperature. By measuring the resistance of the thermistor, the temperature of the thermistor can be determined. As a result, temperatures of components and devices near the thermistor can also be determined or estimated. Resistance sensing techniques are sometimes used as identification techniques to determine the identity of a device, module, or other peripheral unit that is connected to a main device or main assembly. For example, portable communication devices that accept more than one type of modular battery include a battery identification technique to determine the type of battery that is connected to the portable communication device. In order to minimize components and contacts, conventional designs often combine temperature sensing techniques and identification techniques. For example, some conventional portable communication devices that accept more than one type of modular battery include a temperature sensing mechanism that connects to circuits within the battery packs to determine temperature and to identify the battery module. Each type of battery module includes thermistor circuits having different characteristics allowing the portable communication device to identify the particular battery module that is connected. Typically, each thermistor circuit has a resistance to temperature relationship that is offset from relationships of other thermistor circuits within other types of battery modules. Conventional systems are limited, however, in that the resistance-to-temperature relationships of different circuits typically overlap. FIG. 1, for example, is a graphical illustration showing two curves 102, 104 representing the resistance vs. temperature relationship for two conventional battery modules where the curves overlap. The overlap region 106 results in ambiguous data since a measurement of a resistance within the overlap region is associated with both of the curves 102, 104. The measurement may correspond to one type of battery module at a low temperature or another type of battery module at a higher temperature. For example, resistance R may correspond to a temperature of T1 if one battery module is used and a temperature of T2 if another battery is connected. This error could lead to catastrophic results. A battery could explode where a battery module is inaccurately identified and an incorrect charging scheme is applied. Further, the dynamic range and accuracy of the temperature measuring circuit is reduced as the number of identification devices is increased as well as requiring a unique voltage to temperature transfer function for each of the possible curves. In addition, these problems are exacerbated as the number of IDs is increased.

Accordingly, there is a need for an apparatus, system and method for identification with temperature dependent resistive devices.

SUMMARY

An apparatus, system, and method provide device identification and temperature sensing of a device with a temperature sensing circuit (TSC) within the device. The TSC includes a temperature sensing element (TSE) connected in parallel with a voltage clamping network (VCN) that limits the voltage across the TSE to an identification voltage within an identification voltage range when the voltage is greater than or equal to a lower voltage of the identification voltage range. When a voltage below the lower range is applied to the TSC, the VCN appears as an open circuit and the resistance of the TSC corresponds to temperature. For cost or other concerns, a first TSC may omit the VCN to provide a maximum identification voltage and other TSCs may include VCNs with lower identification voltage ranges.

BRIEF DESCRIPTION OF THE DRAWINGS

FIG. 1 is a graphical illustration of a resistance to temperature relationship of two conventional identification and temperature sensing circuits.

FIG. 2 is a block diagram of a temperature sensing circuit (TSC) connected to a measuring temperature measuring and identification device (TMID device) in accordance with the exemplary embodiment.

DETAILED DESCRIPTION

Figure 3:
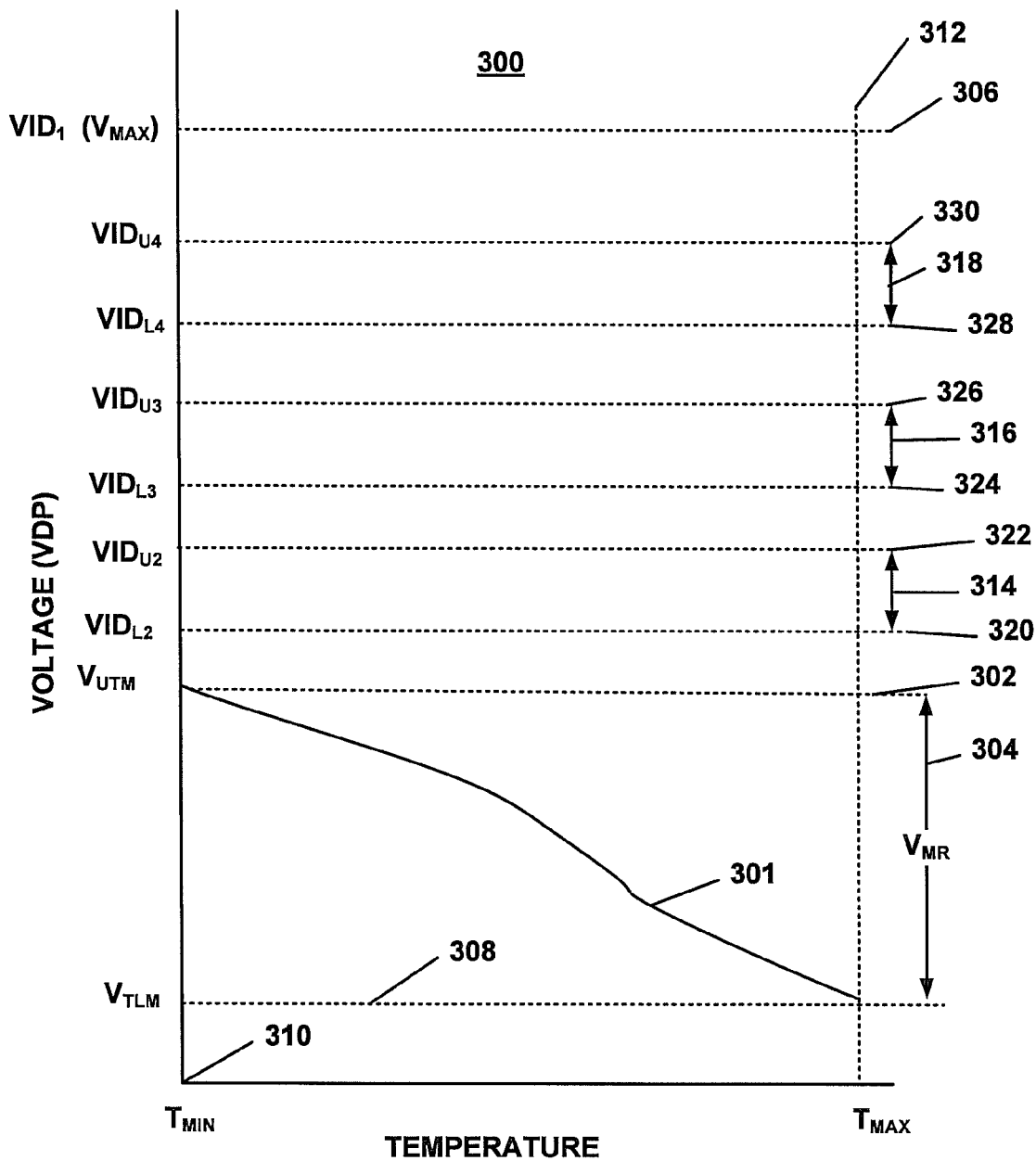
FIG. 3 is a graphical illustration of the voltage ($V_{DP}$) at the detection port during measuring, diagnostic, and identification procedures.

FIG. 2 is a block diagram of a temperature sensing circuit (TSC) 202 connected to a temperature measuring and identification (TMID) device 204 to form a temperature measuring and identification circuit 200. As discussed in further detail below, the TSC 202 is one TSC of a set of TSCs where the characteristics of the TSCs allow the TMID device 204 to distinguish between the different sets of TSCs. The TSCs can be installed within different devices providing a mechanism for monitoring the temperature of a device and for identifying the device. An example of suitable application of the temperature measuring and identification circuit 200 includes installing a different TSC within each type of battery module accepted by a portable device. The TMID device 204 can be implemented as part of portable device to identify different types of battery modules and to determine the temperature of the battery module.

Each TSC 202 includes at least a temperature sensing element (TSE) 208. At least one TSCs of a TSC set includes a voltage clamping network (VCN) 206 connected in parallel to the TSE 208. In the exemplary embodiment, a linearization resistor (not shown in FIG. 2) is also connected in parallel to the TSE 208 in all of the TSCs in order linearize the temperature to resistance curves of the TSC 202.

The TMID device 204 connects to the TSC 202 through a connection interface 210 that includes at least a detector port 212. The connection interface 210 may include any of numerous types of connectors, contacts, or electrical connection mechanisms to provide an electrical connection between the TMID device 204 and the TSC 202. The exemplary connection interface 210 also includes a ground connector. Additional contacts may be used for other signals in some circumstances.

As described below, each set of TSCs of the plurality of TSCs includes a different VCN where the VCN may include any combination of resistors and/or voltage clamping devices, such as diodes. The VCN may be omitted from a TSC to create an identification value (ID) that is not voltage clamped. When the TSC is connected to the TMID device 204, the voltage at the detection port 212 depends on the particular VCN 206, the temperature, and the status of voltage source 214 in the TMID device 204. The VCN limits the detector port voltage to a voltage within an ID voltage range. The number of ID voltage ranges depends on the number of TSC sets that can be connected to the TMID device 204.

The TMID device 204 includes a voltage source 214 connected to the detection port 212 through a limit resistor 216, a current source 218 connected to the detection port 212, and voltage sensor 220 connected to the detection port 212. A controller 222 is configured to control the voltage source 214 and to receive a voltage measurement from the voltage sensor 220. Based on the voltage measurement and the status of the voltage source 214, the controller 222 determines the temperature of the TSE 208 and an ID of the TSC 200 from a plurality of IDs. As discussed below, the voltage source 214, voltage sensor 220, and the controller 222 are implemented within a processor in the exemplary embodiment. The current source 218 is any arrangement of components or devices that provide a known current to the detection port 212. In the exemplary embodiment, a bias resistor (not shown in FIG. 2) is connected to the voltage supply (Vdd) of the TMID device 204 to form the current source 218.

The TMID device 204 controls the voltage source 214 to switch the voltage source 214 on and off. The voltage source 214 provides an output voltage in the "on" state and appears as a high impedance (open circuit) in the "off" state. When the voltage source 214 is off, the current source 218 provides the only current to the detection port 212. In this state, the voltage ($V_{DP}$) measured by the voltage sensor 220 at the detection port 212 is processed by the controller 222 to determine the temperature of the TSE 208 or to determine that an error condition exists. Where the detected voltage is within a temperature measuring voltage range, the voltage ($V_{DP}$) at the detection port corresponds to the resistance of the TSE 208 and the controller 222 calculates the temperature based on the detected voltage. If the voltage is outside the range, the controller 222 determines that an error condition exists. When the voltage source 214 is turned on, the voltage at the detection port ($V_{DP}$) is established by the current from the current source 218 and the current from the voltage source 214. If the voltage is above the temperature measuring voltage range, the controller 222 determines the identification value (ID) of the TSC based on the voltage ($V_{DP}$). If the voltage is below the temperature measuring range, the controller 222 determines that an error condition exists.

FIG. 3 is a graphical illustration of the voltage ($V_{DP}$) at the detection port 212 during measuring, diagnostic, and identification procedures. The various values and ranges depicted in FIG. 3 are not necessarily to scale and are provided to generally illustrate relationships between different voltages and temperatures during different conditions.

During the temperature measuring procedure, the voltage source 214 is turned off and the voltage ($V_{DP}$) indicates a temperature or an error condition. If the voltage ($V_{DP}$) is above an upper temperature measuring voltage ($V_{UTM}$) 302 of the temperature measuring voltage range ($V_{MR}$) 304, the controller 222 determines that no TSC 202 is connected to the TMID device 204. If the voltage ($V_{DP}$) is at or near the supply voltage (Vdd) of the TMID device 204, for example, the voltage indicates that no current is flowing through the detection port 212 and that no circuit is connected to TMID device 204. If the voltage is below a lower temperature measuring voltage ($V_{TLM}$) 308 of the temperature measuring voltage range ($V_{MR}$) 304, the controller 222 determines that something other than a valid and properly operating TSC is connected to the TMID device 204. For example, a voltage near zero can indicate a short circuited detection port 212 that may be due to a failed TSC or an invalid TSC device that is not intended to be connected to the TMID device 204. If the voltage is within the temperature measuring voltage range ($V_{MR}$) 304, the voltage ($V_{DP}$) corresponds to a temperature of the TSE 202 where the temperature may be measured between a minimum temperature ($T_{MIN}$) 310 and a maximum temperature ($T_{MAX}$) 312. In the exemplary embodiment, where the TSE is an NTC thermistor, a maximum voltage (VID1) corresponds to the minimum temperature ($T_{MIN}$). The relationship between detector port voltage ($V_{DP}$) and temperature follows a temperature curve 301. The shape of the curve 301 depends on the temperature sensing element (TSE) 208 characteristics as well as other components in the circuit. In the exemplary embodiment, a linearization resistor is connected in parallel with the TSE 208 in order to make the curve 301 more linear as compared to a TSC that includes a TSE without a linearization resistor.

When the voltage source 214 is turned on, the voltage ($V_{DP}$) corresponds to an identification value (ID) of the TSC 202 or indicates an error condition. If the voltage is above the upper temperature measuring voltage ($V_{UTM}$) 302, the voltage indicates the ID of the TSC 202. Otherwise, the voltage indicates an error condition. For example, a voltage near zero can indicate a short circuited detection port 212 that may be due to a failed TSC or an invalid TSC device that is not intended to be connected to the TMID device 204.

A measured voltage above the upper temperature measuring voltage ($V_{UTM}$) 302 is associated with one of at least two ID voltages or ID voltage ranges. The number of voltage IDs depends on the number of TSCs in the set of TSCs that may be connected to the TMID device 204. When the voltage source 214 is turned on, the controller 222 determines the ID of the TSC 202 based on the voltage ($V_{DP}$) at the detection port 212. The voltage source 214, current source 218, and limit resistor 216 are configured to provide a voltage above the upper temperature measuring voltage temperature ($V_{UTM}$) 302 when the voltage source 214 is on. An example of a suitable scheme includes having one TSC that does not include a VCN and that results in a first ID voltage (VID1) that is near the maximum voltage 306 and that corresponds to a first (ID1), a second TSC that includes a VCN that limits the voltage near $V_{UTM}$ 302 to define a second ID (ID2), and additional TCSs that include VCNs that result in ID voltage ranges that are between the ID voltage (VID1) and the second ID voltage (VID2). The maximum number of ID voltage ranges depends on the available voltage range between the $V_{UTM}$ and the maximum voltage 306 as well as the size of the ID voltage ranges. The maximum voltage 306 is the voltage corresponding to the minimum temperature since the thermistor has a maximum resistance at the minimum temperature. As explained below, the various components are selected such that the worst case maximum voltage of the thermistor is less than a forward voltage of the TSE that occurs at the highest operating temperature.

FIG. 3 illustrates an exemplary system that supports four IDs although any combination and number of ID voltages may be used to group TSCs into ID categories. A first ID voltage 306 results when a first type TSC that does not include a VCN is connected to the TMID device 204 and the voltage source 214 is on. A second ID voltage results within a voltage range 314 when a second type TSC that includes a VCN is connected to the TMID device 204 and the voltage source 214 is on. ID voltages result within a third voltage range 316 and a fourth voltage range 318 when a third type TSC and a fourth type TSC are connected to the TMID device 204, respectively. When the voltage sensor 220 indicates a voltage at the detection port 212 that is within an ID voltage range, the controller 222 determines that the TSC connected to the TMID device has an ID corresponding to the ID voltage range. Therefore, the controller 222 determines that the TSC has one of four IDs for the scheme illustrated in FIG. 3. As discussed below, the IDs associated with an ID voltage range correspond to the TSCs that include VCNs. Since the voltage clamping devices within the VCN, such as diodes, have a forward voltage threshold that varies between devices and over temperature, the ID voltage resulting from a particular TSC may vary from a lower voltage to an upper voltage of the corresponding ID voltage range. Accordingly, the second ID voltage range 314 includes a lower voltage ($VID_{L2}$) 320 and an upper voltage ($VID_{U2}$) 322, the third ID voltage range 316 includes a lower voltage ($VID_{L3}$) 324 and an upper voltage ($VID_{U3}$) 326, and the fourth ID voltage range 318 includes a lower voltage ($VID_{L4}$) 328 and an upper voltage ($VID_{U4}$) 330.

Figure 4:
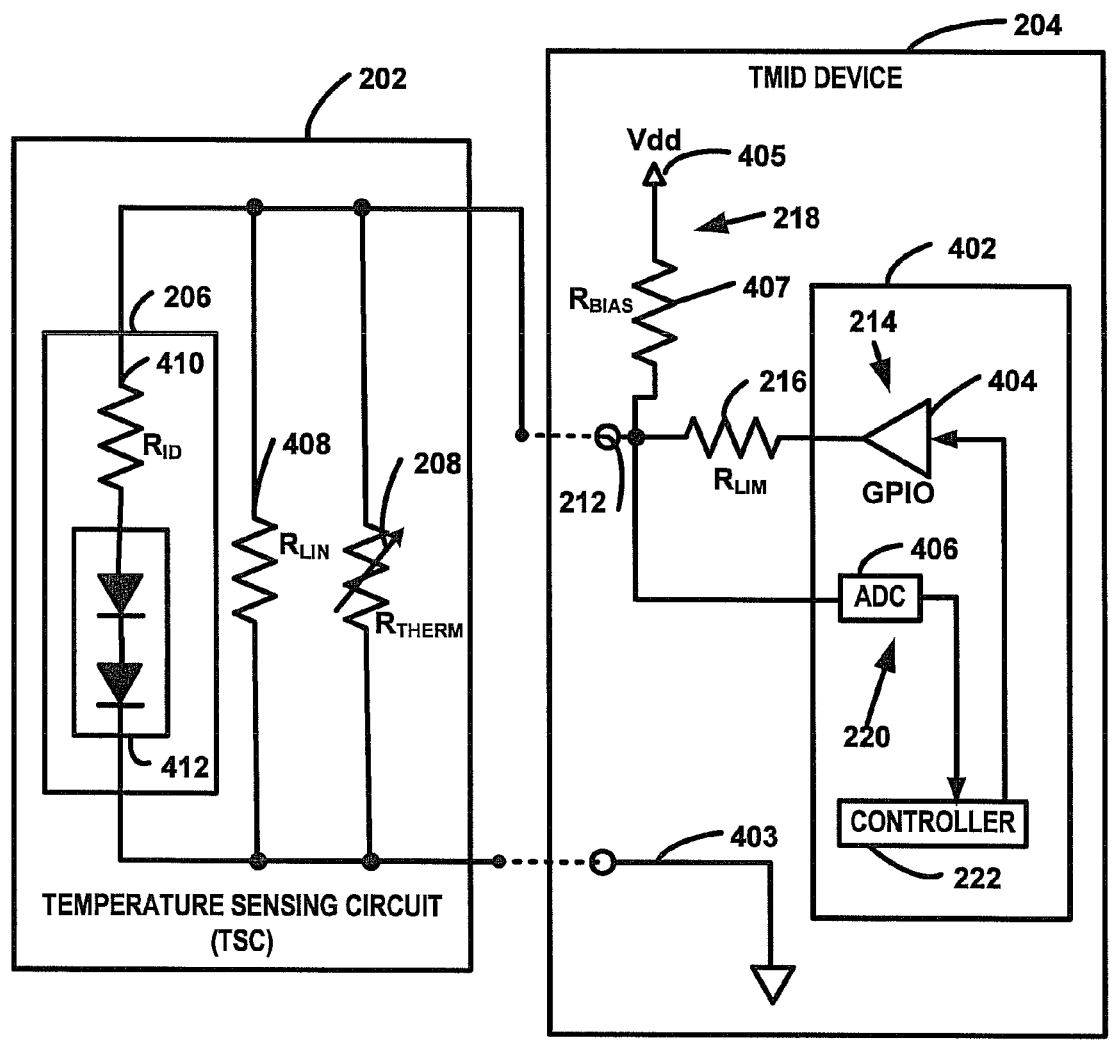
FIG. 4 is a schematic representation of an exemplary implementation of the temperature measuring and identification device (TMID device) where the voltage source, the voltage sensor, and the controller are implemented within a processor.

FIG. 4 is a schematic representation of an exemplary implementation 400 of the temperature measuring and identification circuit 100 where the voltage source 214, the voltage sensor 220, and the controller 222 are implemented within a processor 402. The various components and functions described above with reference to FIG. 1 can be implemented using other combinations of hardware, software, and/or firmware. In the exemplary implementation, the voltage source 214 is a general purpose input/output (GPIO) port 404 of a processor 402. The processor may be any type of general purpose processor, application specific integrated circuit (ASIC), or other microprocessor or processor arrangement, that can perform the function described herein. Code running on the processor 402 facilitates the functions of the controller 222 as well as other functions of the TMID device 204. The controller 222 controls the GPIO port 404 to place the GPIO port in an output state and an input state. In the output state, the GPIO port 404 provides a voltage at or near the Vdd. In the input state, the GPIO port presents an open circuit to the detection port 212 through the limiting resistor ($R_{LIM}$) 216. An analog-to-digital converter (ADC) 406 measures the voltage ($V_{DP}$) by providing the controller 222 a digital representation of the voltage ($V_{DP}$) at the detection port 212. A bias resistor ($R_{BIAS}$) 407 connected to the voltage supply (Vdd) provides the current source 218 for temperature measurement.

Any one of at least two TSCs can be connected to the TMID device 204. FIG. 4 illustrates a TSC that includes a linearization resistor ($R_{LIN}$) 408, a TSE 208 and a VCN 206, where the TSE 208 is a thermistor 208 and the VCN 206 includes an identification resistor ($R_{ID}$) 410 in series with a voltage clamping device 412. In the exemplary implementation, the voltage clamping device 412 is a diode arrangement 412 that includes one or more diodes that have a forward voltage within a forward voltage range. The voltage range depends on the number and type of diodes. For example, a typical PN junction, silicon diode has a forward voltage of approximately 0.7 volts. Two silicon diodes in series will have a collective forward voltage of about 1.4 volts. Due to manufacturing variations and other factors, the forward voltage of a particular diode may be greater than or less than the expected drop. Further, the forward voltage varies over temperature. Accordingly, a voltage range is defined for the diode arrangement 412 where any particular diode arrangement will have a forward voltage within the range. Examples of other suitable diode arrangements include arrangements using single Zener diodes and active Zener diodes. Zener diodes can be used with reverse bias to maintain a fixed voltage across their terminals. In addition, the voltage clamping variations of Zener diodes are typically less than the forward voltage variations of PN junction silicon diodes over temperature, bias current and manufacturing variations. Active Zener diodes may be preferred in some circumstances since active Zener diodes, also known as "shunt regulators" have variations in clamping voltages lower than normal Zener diodes.

For the purpose of temperature measurement, the GPIO port 404 is set to the "Off" state such that current may not flow into or out of $R_{LIM}$ 216. In this case, current may only be supplied by $R_{BIAS}$ 407 into the TSC 202. The values of $R_{BIAS}$ 407, $R_{LIN}$ 408 and $R_{THERM}$ 208 are selected such that at the minimum temperature where $R_{THERM}$ will exhibit its maximum resistance, the voltage sensed by the ADC 220 and due to the resulting voltage divider formed between Vdd 405 and ground 403 is less than the forward voltage of the diode arrangement 412. The resulting voltage will only be a factor of the temperature measurement components $R_{BIAS}$ 407, $R_{LIN}$ 408 and $R_{THERM}$ 208 which is sensed by ADC 406. The ADC 406 converts the analog voltage measurement to a digital value that is processed by the controller 222 as a temperature measurement.

For the purpose of identification, when the TSC 202 is connected to the TMID device 204, the processor 402 sets the GPIO port 404 to an output state that, in the exemplary embodiment, is powered from the same supply voltage Vdd 405 as the $R_{BIAS}$ resistor 406. Accordingly, the limit resistor 216 and the $R_{BIAS}$ resistor 407 form an equivalent parallel combination resistance that is in series with the resistance of TSC 202. The voltage ($V_{DP}$) at the detection port 212 is the output of the resulting voltage dividing network between the supply Vdd 405 and ground 403 and is sensed by ADC 406. The ADC 406 that converts the analog voltage to a digital value that is processed by the controller 222 as an ID value.

Figure 5:
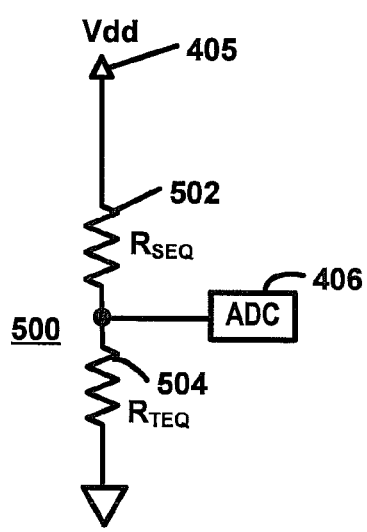
FIG. 5 is a schematic representation of an equivalent circuit of a TMID device connected to a TSC that does not include a VCN.

FIG. 5 is a schematic representation of an equivalent circuit 500 of a TMID device 204 connected to a TSC 202 that does not include a VCN. As described above, when the GPIO port 404 is set to the output state, the limit resistor, $R_{LIM}$ 216 and the bias resistor, $R_{BIAS}$ 407 form an equivalent parallel combination resistance ($R_{SEQ}$) connected to the supply, Vdd 405. The limit resistor, $R_{LIN}$ 408 and thermistor, $R_{THERM}$ 208 form an equivalent parallel combination resistance $R_{TEQ}$. The values of the resistors $R_{LIM}$ 216, $R_{BIAS}$ 407, $R_{LIN}$ 408 and $R_{THERM}$ 208 are selected such that the value of $R_{SEQ}$ 502 is much, much lower than $R_{TEQ}$ 504 so that a majority of Vdd 405 is dropped across $R_{TEQ}$ 504. The ADC 406 will subsequently sense an ID voltage 306 that is the maximum ID voltage of the set of ID voltages.

Figure 6:
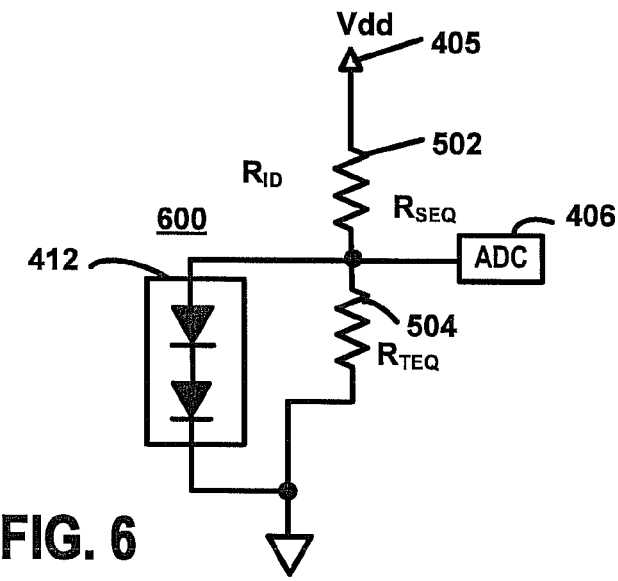
FIG. 6 is a schematic representation of an equivalent circuit of a TMID device connected to a TSC having a VCN that includes only a voltage clamping device.

FIG. 6 is a schematic representation of an equivalent circuit 600 of TMID device 204 connected to a TSC 202 having a VCN that includes only a clamping arrangement 412. As described above, when the GPIO port 404 is set to the output state, the limit resistor, $R_{LIM}$ 216 and the bias resistor, $R_{BIAS}$ 407 form an equivalent parallel combination resistance $R_{SEQ}$ connected to Vdd 405. Because of the claming arrangement 412, the voltage into the ADC 406 does not rise to Vdd 405 as in the previous example but instead is clamped to the forward voltage of clamping arrangement 412 resulting in the lowest ID voltage range 314 of the ID voltage set. The resulting voltage is converted by ADC 406 as detailed above.

Figure 7:
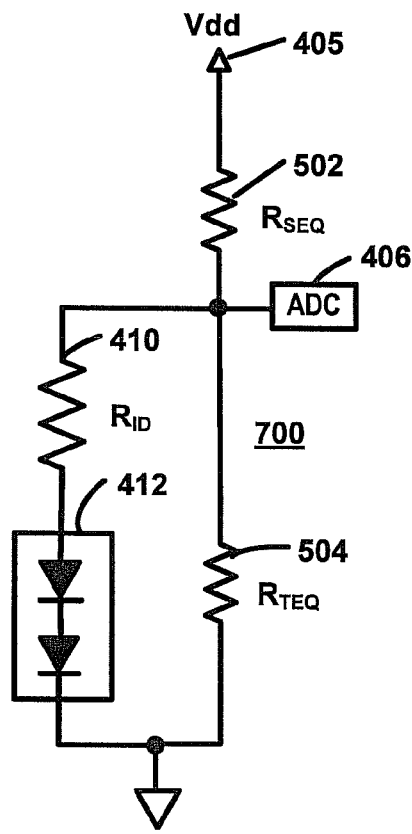
FIG. 7 is a schematic representation of an equivalent circuit of a TMID device connected to a TSC having a VCN that includes a voltage clamping device in series with an identification resistor ($R_{ID}$).

FIG. 7 is a schematic representation of an equivalent circuit of a TMID device 204 connected to TSC 202 having a VCN that includes a clamping arrangement 412 in series with an identification resistor (Rid) 410. As described above, when GPIO port 404 is set to the output state, $R_{LIM}$ 216 and $R_{BIAS}$ 407 form an equivalent parallel combination resistance, $R_{SEQ}$ connected to Vdd 405. Because of the clamping arrangement 412, the voltage at the ADC 406 does not rise to Vdd 405 and because of the identification resistor, $R_{ID}$ 410, the voltage at the ADC 406 is greater than the forward voltage of the diode arrangement 412. The identification resistor, $R_{ID}$ 410, is selected such that it forms a voltage divider between Vdd 405 and the forward voltage of the diode arrangement 412 when in series with $R_{SEQ}$ 502. The resulting voltage is converted by ADC 406 as detailed above. Accordingly, the ID of the TSC may be changed by adjusting the value of $R_{ID}$ 410 such that a third ID voltage range 316 corresponds to a TSC 202 that has an $R_{ID}$ 410 of one value and a fourth ID voltage range 318 that has an $R_{ID}$ 410 with another value.

Figure 8:
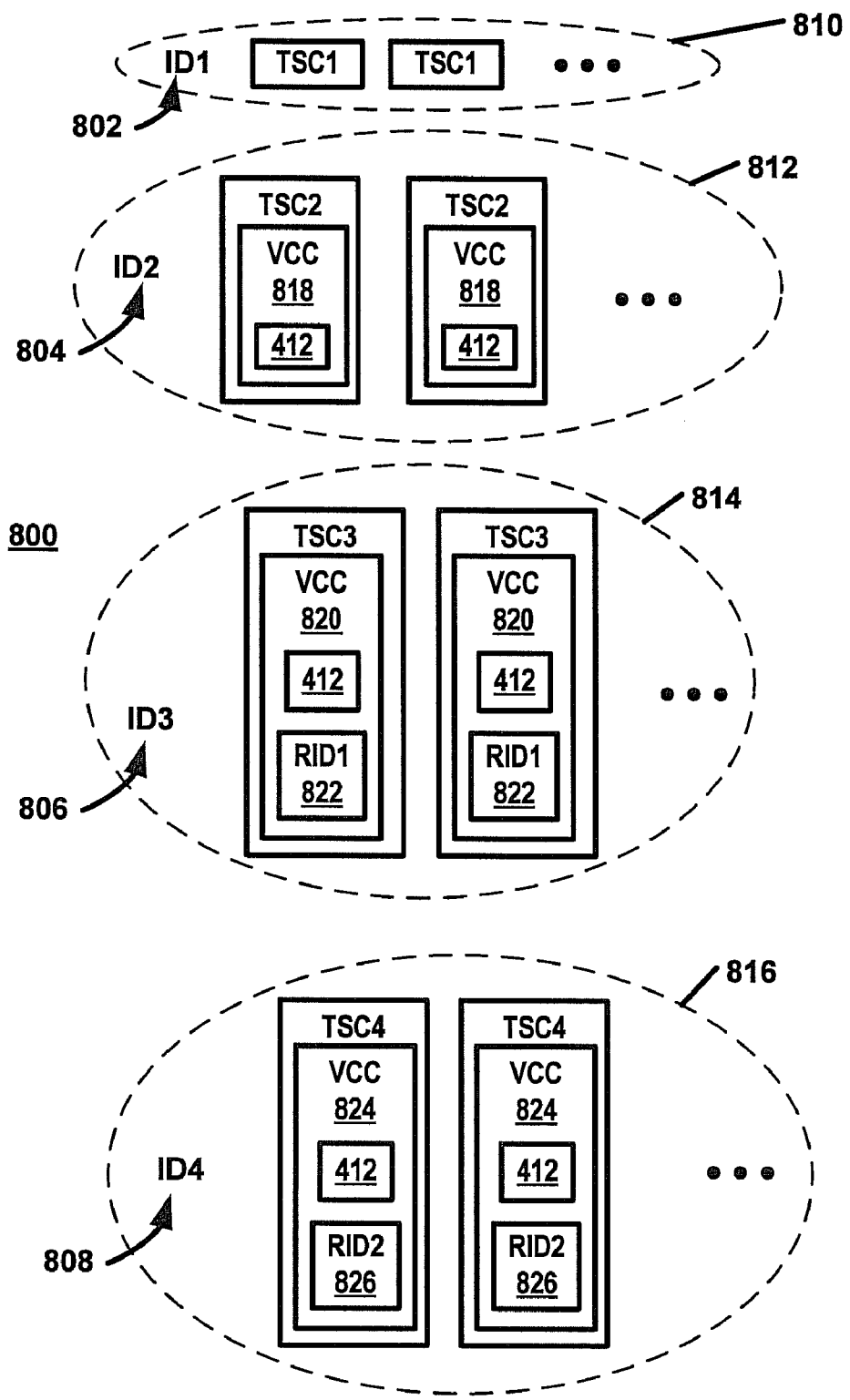
FIG. 8 is a block diagram of a plurality of temperature sensing circuits (TSCs) of an identification system including four identification values (IDs).

FIG. 8 is a block diagram of a plurality of temperature sensing circuits (TSCs) 800 of an identification system including four identification values (IDs) 802, 804, 806, 808. The TSCs of a first set of TSCs 810 have a first identification value (ID1) 802, the TSCs of a second set of TSCs 812 have a second identification value (ID2) 804, TSCs of a third set of TSCs 814 have a third identification value (ID3) 806, and the TSCs of a fourth set of TSCs 816 have a fourth identification value (ID4) 808. In the exemplary system, the TSCs of the first set 810 include only a temperature sensing element 208 and a linearization resistor 408 and do not include a VCN. Accordingly, ID1 corresponds to the first voltage ID 306 shown in FIG. 3.

The TSCs of the second set 812 include a temperature sensing element 208, a linearization resistor 408, and a VCN 818 that includes a voltage clamping device 412. The VCN 818 does not include an identification resistor 410. Accordingly, the second ID corresponds to the second ID voltage range 314.

The TSCs of the third set 814 include a temperature sensing element 208, a linearization resistor 408, and a VCN 818 that includes a voltage clamping device 412 and an identification resistor 410 having a first ID resistance 822. The third ID corresponds to the third ID voltage range 316.

The TSCs of the fourth set 816 include a temperature sensing element 208, a linearization resistor 408, and a VCN 824 that includes a voltage clamping device 412 and an identification resistor 410 having a second ID resistance 826. The fourth ID corresponds to the fourth ID voltage range 318.

The values of the components of the TSC 202 and the TMID device 204 are selected based on the number of IDs, the desired temperature measuring range, the supply voltage and other factors. Typically, the worst case upper voltage limit corresponds to the minimum temperature of a negative temperature coefficient (NTC) thermistor. Accordingly, the values of the components are selected such that the worst case upper voltage limit is less than the lowest forward voltage limit of the voltage clamping device 412 (diode arrangement) which typically occurs at the highest temperature due to the negative temperature coefficient of the diode. The maximum dynamic range for a temperature measurement can be achieved by using an appropriately low reference during the temperature conversion.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A temperature sensing circuit comprising:
   a temperature sensing element; and
   a voltage clamping network comprising an identification resistor in series with a diode arrangement, the voltage clamping network connected in parallel to the temperature sensing element and configured to limit a voltage across the voltage clamping network to an identification voltage range when the voltage is greater than or equal to a lower voltage of the identification voltage range.

2. The temperature sensing circuit of claim, 1 wherein the identification voltage range is one of a plurality of identification voltage ranges, each identification voltage range corresponding to a battery type identifier (ID).

3. The temperature sensing circuit of claim 1, wherein the diode arrangement comprises a Zener diode.

4. The temperature sensing circuit of claim 1, wherein the diode arrangement comprises a plurality of diodes connected in series.

5. The temperature sensing circuit of claim 1, wherein the diode arrangement comprises an active Zener diode.

6. The temperature sensing circuit of claim 5, wherein the active Zener diode is one of a plurality of active zener devices configured to provide one of a plurality of clamping voltages.

7. The temperature sensing circuit of claim 6, wherein each of the plurality of clamping voltages corresponds to a battery type identifier.

8. The temperature sensing circuit of claim 1, wherein the identification resistor is one of a plurality of identification resistors, each identification resistor corresponding to one of a plurality of identification voltage ranges.

9. A temperature measuring and identification (TMID) device comprising:
   a voltage source connected to a detection port through a limiting resistor and comprising a general purpose input/output (GPIO) port of a processor, the GPIO port providing an output voltage in an output state and providing an open circuit when the GPIO is an off state;
   a current source connected to the detection port; and
   a controller configured to identify a temperature measuring circuit connected to the detection port from a plurality of temperature measuring circuits based on a first measured voltage at the detection port when the voltage source provides the output voltage resulting in a first measured voltage above an upper voltage of a temperature measuring voltage range and configured to determine a temperature of the temperature sensing circuit based on a second measured voltage at the detection port when the GPIO is in the off state.

10. The TMID device of claim 9, wherein the current source comprises a bias resistor connected to a supply voltage, the bias resistor connected in series with the temperature sensing element when the identification device is connected to the detection port.

11. The TMID device of claim 9, wherein the temperature is a battery temperature of a battery and the controller is further configured to identify the battery based on the identified temperature measuring circuit.

12. The TMID device of claim 9, further comprising:
an analog to digital converter (ADC) connected to the detection port and configured to provide a first digital value corresponding to the first measured voltage and a second digital value corresponding to the second measured voltage.

13. The TMID device of claim 12, the controller configured to determine that the temperature measuring circuit has a first identification value when the first measured voltage is within a first identification voltage range and to determine that the temperature circuit has a second identification value when the first measured temperature is within a second identification voltage range.

14. The TMID device of claim 12, wherein the first measured voltage is equal to a voltage clamp voltage within a clamp voltage range of a voltage clamp circuit connected in parallel to a temperature sensing element within the temperature measuring circuit.

15. A device identification system comprising:
a plurality of temperature sensing circuits comprising a first set of temperature sensing circuits corresponding to a first identification value and a second set of temperature sensing circuits corresponding to a second identification value, at least some of the temperature sensing circuits comprising a temperature sensing element and a voltage clamping network connected in parallel to the temperature sensing element, the voltage clamping network configured to limit a voltage at a connector to an identification voltage range when the voltage is greater than or equal to a lower voltage of the identification voltage range; and
a temperature measuring and identification (TMID) device having a detection port configured to connect the connector of each of the plurality of temperature sensing circuits, the TMID device comprising:
a voltage source connected to a detection port through a limiting resistor;
a current source connected to the detection port; and
a controller configured to identify a connected temperature measuring circuit connected to the detection port from the plurality of temperature measuring circuits based on a first measured voltage at the detection port when the voltage source provides an output voltage resulting in a first measured voltage above an upper voltage of a temperature measuring voltage range and configured to determine a temperature of the connected temperature sensing circuit based on a second measured voltage at the detection port when the voltage source is off.

16. The identification system of claim 15, wherein each of the plurality of temperature sensing circuits is enclosed within a battery pack comprising a battery and wherein the first identification value corresponds to a first battery type of the battery and second identification value corresponds to a second battery type first set of temperature sensing circuits.

17. The identification system of claim 15, wherein each of the temperature sensing circuits of the first set comprises the temperature sensing element and wherein each of the temperature sensing circuits of the second set comprises the temperature sensing element and a second set voltage clamping network connected in parallel to the temperature sensing element, the second set voltage clamping network configured to limit the voltage at the connector to a second set identification voltage range when the voltage is greater than or equal to a lower voltage of the second set identification voltage range.

18. The identification system of claim 17, wherein the plurality of temperature sensing circuits further comprises a third set of temperature sensing circuits corresponding to a third identification value.

19. The identification system of claim 18. wherein each of the temperature sensing circuits of the third set comprises the temperature sensing element and a third set voltage clamping network connected in parallel to the temperature sensing element, the third set voltage clamping network configured to limit the voltage at the connector to a third set identification voltage range when the voltage is greater than or equal to a lower voltage of the third set identification voltage range, the third set voltage clamping network comprising a voltage clamping device connected in series with an identification resistor.

20. The identification system of claim 19, wherein the plurality of temperature sensing circuits further comprises a fourth set of temperature sensing circuits corresponding to a fourth identification value, each of the temperature sensing circuits of the fourth set comprising the temperature sensing element and a fourth set voltage clamping network connected in parallel to the temperature sensing element, the fourth set voltage clamping network configured to limit the voltage at the connector to a fourth set identification voltage range when the voltage is greater than or equal to a lower voltage of the fourth set identification voltage range, the fourth set voltage clamping network comprising the voltage clamping device connected in series with another identification resistor.

* * * * *